June 29, 1937. B. LOEFFLER 2,085,199
ROTATABLE DIESEL AIR CHAMBER OPERATING MECHANISM
Filed Oct. 1, 1935 3 Sheets-Sheet 1
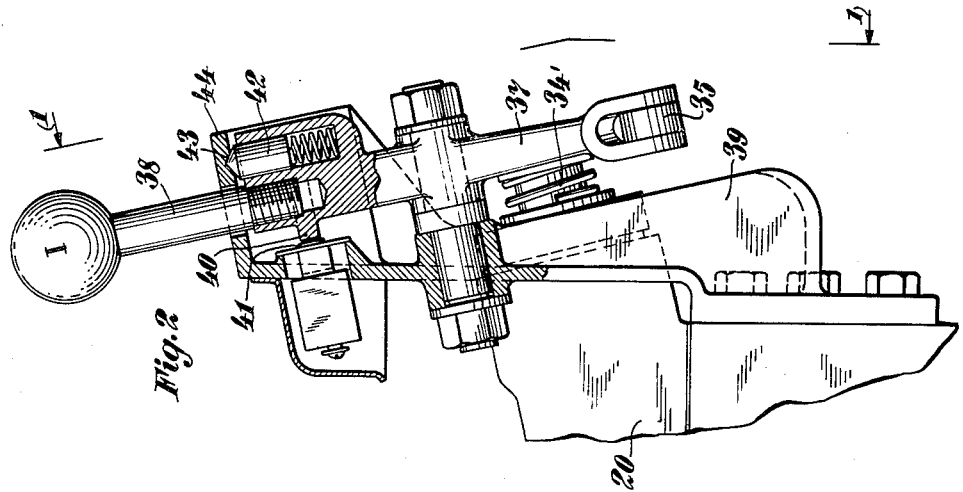
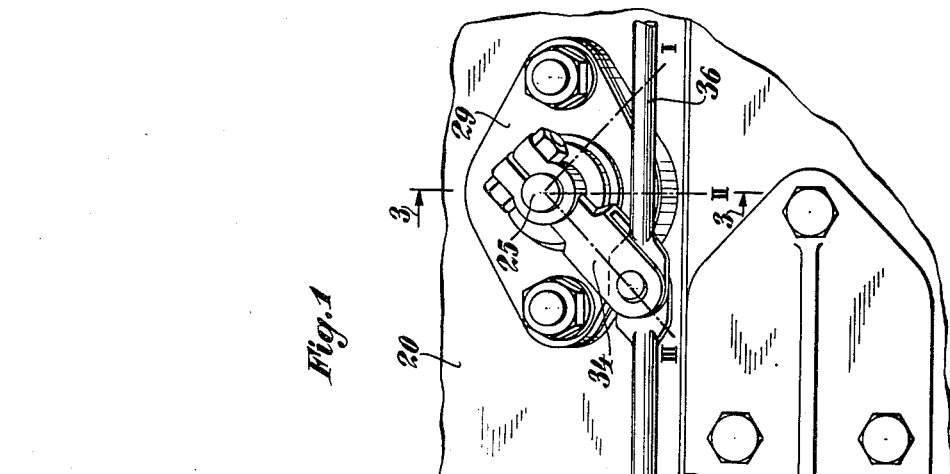
INVENTOR.
*Bruno Loeffler,*
BY
HIS ATTORNEY.

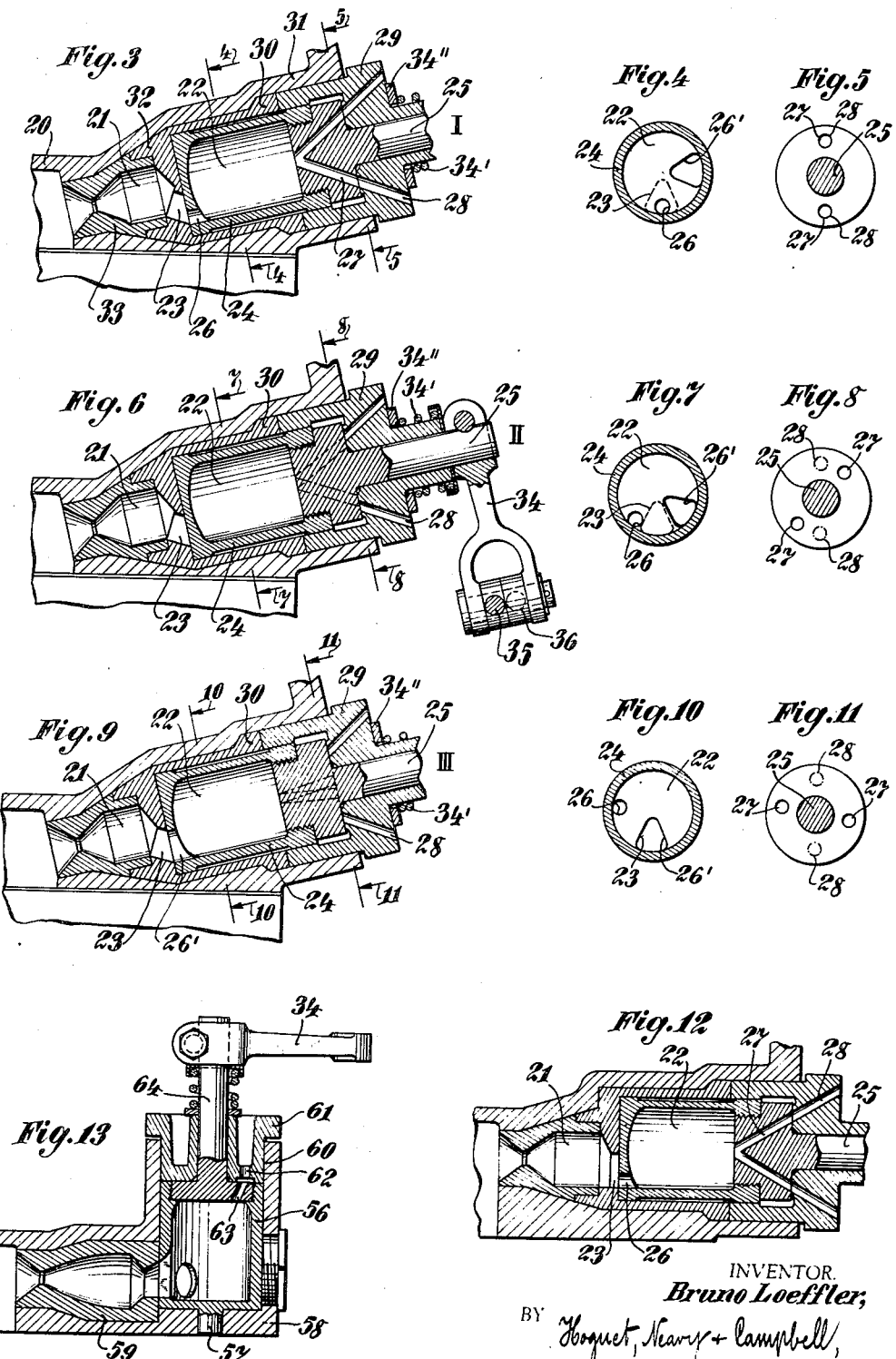

June 29, 1937. B. LOEFFLER 2,085,199
ROTATABLE DIESEL AIR CHAMBER OPERATING MECHANISM
Filed Oct. 1, 1935 3 Sheets-Sheet 3
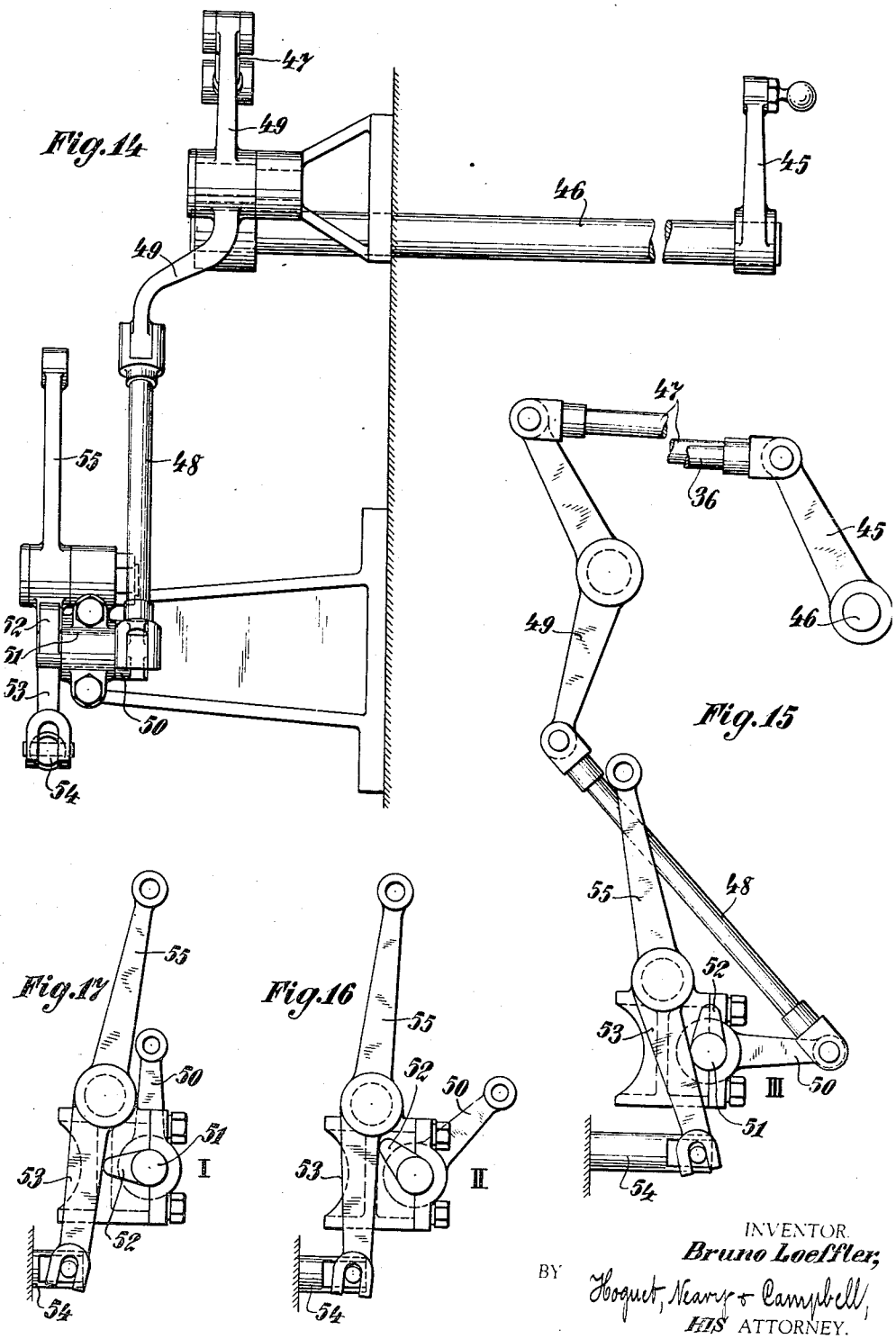
INVENTOR.
Bruno Loeffler,
BY Hoguet, Neary & Campbell,
HIS ATTORNEY.

Patented June 29, 1937

2,085,199

UNITED STATES PATENT OFFICE 2,085,199

ROTATABLE DIESEL AIR CHAMBER OPERATING MECHANISM

Bruno Loeffler, Plainfield, N. J., assignor to International Motor Company, New York, N. Y., a corporation of Delaware Application October 1, 1935, Serial No. 43,024

5 Claims. (Cl. 123—48)

The present invention relates to mechanisms by means of which Diesel engines may be controlled and embodies, more specifically, an improved valve operating mechanism for use on Diesel engines of the type embodying air and combustion chambers between which communication is to be controlled in accordance with predetermined phases of operation of the engine.

More particularly, the invention embodies an improved air valve controlling mechanism wherein the valve is of the rotatable type and is designed and operated in such fashion that, during cranking of the engine, decompression is accomplished, while during the starting operation, the compression is built up substantially and, during normal running of the engine, the air and combustion chambers function normally.

An object of the invention is to provide a simplified mechanism by means of which communication between the air and combustion chambers of a Diesel engine may be controlled effectively.

A further object of the invention is to provide a mechanism of the above character, the elements of which are simple in construction and operation in order that operation of the engine may be effected positively under all operating conditions.

Further objects of the invention will be apparent as it is described in detail in connection with the accompanying drawings, wherein Figure 1 is a view in end elevation, taken on the broken line 1—1 of Figure 2, and looking in the direction of the arrows;

Figure 2 is a view in section taken on the line 2—2 of Figure 1, and looking in the direction of the arrows;

Figure 3 is a view in section, taken on the line 3—3 of Figure 1 and looking in the direction of the arrows, this view showing the elements in cranking position;

Figure 4 is a view in section taken through the valve on line 4—4 of Figure 3, and looking in the direction of the arrows;

Figure 5 is a view in section taken through the valve of Figure 3, the view being taken on line 5—5 of Figure 3 and looking in the direction of the arrows;

Figure 6 is a view similar to Figure 3, showing the elements in starting position;

Figure 7 is a view similar to Figure 4, taken on the line 7—7 of Figure 6;

Figure 8 is a view similar to Figure 5, taken on the line 8—8 of Figure 6;

Figure 9 is a view similar to Figure 3, showing the elements in running position;

Figure 10 is a view similar to Figures 4 and 7, taken on the line 10—10 of Figure 9;

Figure 11 is a view similar to Figures 5 and 8, taken on the line 11—11 of Figure 9;

Figure 12 is a view similar to Figure 3 showing a modified form of the invention;

Figure 13 shows a further modification of the invention;

Figure 14 is a view in end elevation, illustrating the fuel pump interlock mechanism of the present invention;

Figure 15 is a view in end elevation, showing the elements of Figure 14;

Figure 16 is a view similar to Figure 15, showing the locking mechanism when the elements are in the starting position;

Figure 17 shows the fuel pump locking elements when the device is in the cranking position.

With reference to the above drawings, 20 illustrates a Diesel engine head upon which one or more valves may be provided for controlling the communication between combustion chambers 21 and air chambers 22. A passage 23 is provided between such chambers, the chamber 22 being formed in a rotatable valve member 24 which is provided with a valve stem 25. A port 26 is formed in the valve member 24, while ports 27 are formed therein to communicate with passages 28 formed in the cover member 29 within which the valve is received. In addition to passage 26, a passage 26′ is provided in order that communication may be established between chambers 21 and 22 when required. It will be seen that the cover 29 abuts against a cylindrical fitting 30 which is received within a hollow extension 31, formed on the engine head. The fitting 30 terminates in a conical portion 32 within which the passage 23 is formed, this portion of the fitting cooperating with a combustion chamber fitting 33 which is also received and seated within the extension 31. It will thus be seen that the cover member 29 serves to locate all of the foregoing elements in proper position within the extension 31.

The valve stem 25 extends out of the cover 29 and has secured to the end thereof a lever 34, a spring 34′ being provided and seated against a washer 34″ to urge the valve normally in seated position against the cover 29.

Arm 34 is connected to a link 35 as well as to a link 36 which ties in the operation of arm 34 with similar arms of additional valves. Link 35 is connected to the arm 37 of an operating lever 38 which is mounted upon a bracket 39 and provided with a cam 40 which engages a switch actuating plunger 41 when the arm is in the cranking position of the engine. Under such condition, the switch 41 is closed and the engine is adapted to be driven by the starting motor.

In order that the member 38 may be located properly in its various positions, a spring pressed detent 42 is carried thereby and adapted to engage recesses 43, formed in an arcuate flange 44 on the bracket 39.

In order that the fuel pump control may be tied in properly with the operation of the engine, link 36 may be connected at one end to an arm 45 which is mounted upon a shaft 46 to one end of which is connected a link 47. This link is connected to a link 48 through a bell crank lever 49, the link 48 being connected to an arm 50 formed upon a pivot shaft 51 upon which a lock arm 52 is formed. This arm 52 is adapted to be moved into the path of an arm 53 which is connected to a fuel pump control rod 54. Arm 53 is also formed with an arm 55 which may be connected to any suitable operating member and the mechanism thus enables the locking arm 52 to be moved into the path of the arm 53 when the mechanism is in cranking position to lock the fuel pump control member against operation. This position is shown in Figure 17. During starting, the arm 52 is partially withdrawn from the path of the arm 53 and the pump functions in a desired fashion. This position of the elements is shown in Figure 16. Figure 15 illustrates the normal running position of the mechanism.

In the construction shown in Figure 12, the axis of the chambers 21 and 22 is offset with respect to one another to adapt the elements to particular construction requirements, while, in Figure 13, the air chamber is formed on a vertical axis. In this construction, the valve member 56 is provided with a central stud 57 which is received within the fitting 58 in which the combustion chamber fitting 59 is received. Fitting 58 is formed with a recess 60 within which valve 56 is received, this recess being closed by means of a lever member 61 in which a passage 62 is formed. A port 63 in the top of valve 56 is adapted to provide communication between the interior of the valve which forms the air chamber and the external atmosphere. Valve stem 64 on the valve may be actuated by arms 34 as described in connection with the construction shown in Figures 1 and 2.

While the invention has been described with specific reference to the accompanying drawings, it is not to be limited, save as defined in the appended claims.

I claim:

1. An air valve for controlling the compression and ignition of compression ignition engines wherein the valve, in operation, is moved to cranking, starting and running positions, the air valve consisting of a rotatable member having a chamber formed therein adapted to serve as an air chamber during normal operation of the engine, relatively stationary means to carry the valve and having a port, the rotatable member being formed with a port cooperating with the port in the stationary means, and operating mechanism to rotate the valve.

2. An air valve for controlling the compression and ignition of compression ignition engines having a combustion chamber formed therein, wherein the valve, in operation, is moved to cranking, starting and running positions, the air valve consisting of a rotatable member having a chamber formed therein adapted to serve as an air chamber during normal operation of the engine, one end of the rotatable member being formed with a port through which communication is established between the chamber in said member and the combustion chamber in the engine and the other end of the rotatable member having a port formed therein through which communication is established between the chamber in the said member and the external atmosphere, and operating mechanism to rotate the valve.

3. An air valve for controlling the compression and ignition of compression ignition engines having a combustion chamber formed therein, wherein the valve, in operation, is moved to cranking, starting and running positions, the air valve mechanism consisting of a recessed extension in the engine having a cover formed with a passage, a rotatable member in the recessed extension having a chamber formed therein adapted to serve as an air chamber during normal operation of the engine, one end of the rotatable member being formed with a port through which communication is established between the chamber in said member and the combustion chamber in the engine and the other end of the rotatable member having a port formed therein through which and the passage in the cover communication is established between the chamber in said member and the external atmosphere, and operating mechanism to rotate the valve.

4. An air valve for controlling the compression and ignition of compression ignition engines having a combustion chamber formed therein, wherein the valve, in operation, is moved to cranking, starting and running positions, the air valve mechanism consisting of a recessed extension in the engine having a cover formed with a passage, a stationary cylindrical fitting in the extension, a rotatable fitting in the cylindrical fitting having a chamber formed therein adapted to serve as an air chamber during normal operation of the engine, one end of the rotatable member being formed with a port through which communication is established between the chamber in said member and the combustion chamber in the engine and the other end of the rotatable member having a port formed therein through which and the passage in the cover communication is established between the chamber in said member and the external atmosphere, and operating mechanism to rotate the valve.

5. An air valve for controlling the compression and ignition of compression ignition engines wherein the engine is provided with a combustion chamber and the valve, in operation, is moved to cranking, starting and running positions, the air valve mechanism consisting of a recessed extension having a cover formed with a passage, a stationary cylindrical fitting in the extension, a rotatable member in the fitting having a chamber formed therein adapted to serve as an air chamber during normal operation of the engine, one end of the rotatable member being formed with a port having an axis offset with respect to the axis of the combustion chamber through which communication is established between the air chamber and combustion chamber, and the other end of the rotatable member having a port formed therein through which and the passage in the cover communication is established between the chamber in said member and the external atmosphere, and operating mechanism to rotate the valve.

BRUNO LOEFFLER.